(12) United States Patent
Ady et al.

(10) Patent No.: US 8,295,504 B2
(45) Date of Patent: Oct. 23, 2012

(54) METHODS AND DEVICES FOR FAN CONTROL OF AN ELECTRONIC DEVICE BASED ON LOUDNESS DATA

(75) Inventors: Roger W. Ady, Chicago, IL (US); Damon Afualo, San Diego, CA (US); William J. Storti, Haverford, PA (US)

(73) Assignee: Motorola Mobility LLC, Libertyville, IL (US)

( * ) Notice: Subject to any disclaimer, the term of this patent is extended or adjusted under 35 U.S.C. 154(b) by 1192 days.

(21) Appl. No.: 12/115,561

(22) Filed: May 6, 2008

(65) Prior Publication Data

US 2009/0281642 A1    Nov. 12, 2009

(51) Int. Cl.
*H04R 3/02* (2006.01)
*G01F 17/00* (2006.01)
(52) U.S. Cl. .................................. 381/73.1; 700/94
(58) Field of Classification Search ............... 381/71.1, 381/71.3, 73.1; 700/94
See application file for complete search history.

(56) References Cited

U.S. PATENT DOCUMENTS

| 6,494,381 B2 | 12/2002 | Bulthuis |
| 6,591,198 B1 | 7/2003 | Pratt |
| 6,608,906 B2 | 8/2003 | Krochmal et al. |
| 2005/0178135 A1 | 8/2005 | Schanin et al. |

FOREIGN PATENT DOCUMENTS

| KR | 1020070062260 A | 6/2007 |
| WO | 0251228 A2 | 6/2002 |
| WO | 2006046179 A2 | 5/2006 |
| WO | WO 2008015733 A1 * | 2/2008 |

OTHER PUBLICATIONS

Patent Cooperation Treaty; "Notification of Transmittal of the International Search Report and the Written Opinion of the International Searching Authority, or the Declaration"; International Application No. PCT/US2009/040438; International Filing Date Apr. 14, 2009; Date of Mailing Nov. 30, 2009; 11 pages.

* cited by examiner

*Primary Examiner* — Ramon Barrera (57) ABSTRACT

Disclosed are methods and devices for controlling the state of a fan of an electronic device during audio output based in whole or in part on loudness data of a digital audio file. An audio data file is sampled so that loudness data is determined from the sample audio data. The loudness data may indicate at least one portion of the audio data file that has a predetermined loudness level. For example, when the loudness data indicates that the audio output is low, the fan can be deactivated or slowed. In this way the noise of the fan does not impair the user's audio experience. Alternatively, when the loudness data indicates that the audio output is high, the fan can be activated or its speed may be increased. The predetermined loudness level of the audio output may have a value that is sufficiently high to mask fan noise.

10 Claims, 5 Drawing Sheets

METHODS AND DEVICES FOR FAN CONTROL OF AN ELECTRONIC DEVICE BASED ON LOUDNESS DATA

FIELD

Disclosed are methods and devices for fan control of an electronic device based on loudness data, and more particularly based upon sampling a digital audio file to determine loudness data to control the state of a fan of an electronic device.

BACKGROUND

Many types of electronic devices include cooling fans. In electronic devices, such as media playback systems, fan noise can interfere with users' audio experiences. Different solutions to reducing fan noise include, for example, temperature-sensing control systems that can keep cooling fans silent until they are needed. Also, quiet fans such as "feather" fans have been developed that make minimal noise. However, in high-power systems such as certain audio-visual systems, fans must run at high RPMs. Therefore, even quiet fans can generate significant noise.

Audio-visual systems are often stored by consumers in cabinets or in built-in wall units. Space-consciousness motivates consumers to keep their systems in small confined spaces. Accordingly, cooling stored devices by convection is restricted, and therefore, their cooling fans may run quite a lot, generating significant noise. Temperature-sensing control systems may operate to keep the devices cool, however, at the expense of interfering with the audio content of the media. Accordingly, a user's audio experience may be impaired, particularly when the audio output level is low.

Certain systems may utilize, for example, an ambient noise detector to sense fan noise that in turn can control a fan by activating, deactivating, or varying the speed of the fan. An ambient noise detector may sense the audio output level of the media as it is playing to regulate the fan noise. However, since fan activation requires a specific amount of time before the fan is fully operational as well as a specific amount of time before the fan is finally stopped, a system including an ambient noise detector to regulate fan noise may only partially avoid the fan noise, particularly during quiet moments in the audio output of the media. In using ambient noise to control the fan, there is no time to accelerate the fan so the air flow may be latent. The lack of synchronization with the audio output of the media by monitoring the ambient noise of the media does not resolve fan noise interference, particularly during quiet moments of the audio output.

DETAILED DESCRIPTION

Disclosed are methods and devices for controlling the state of a fan of an electronic device during audio output based in whole or in part on loudness data of a digital audio file. An audio data file is sampled so that loudness data is determined from the sample audio data. The loudness data may indicate at least one portion of the audio data file that has a predetermined loudness level. For example, when the loudness data indicates that the audio output is low, the fan can be deactivated or slowed. In this way the noise of the fan does not impair the user's audio experience. Alternatively, when the loudness data indicates that the audio output is high, the fan can be activated or its speed may be increased. The predetermined loudness level of the audio output may have a value that is sufficiently high to mask fan noise.

In high powered systems, when the loudness of the audio output is high, more heat may be generated by the electronic device. Therefore, activating or increasing the speed of the fan during a loud portion of an audio data file beneficially increases cooling when the electronic device is most likely to generate heat. Also, in particular, high powered systems, it may be beneficial to operate the fan as much as possible, based on at least the above-described loudness data and optionally other factors. In this manner, a cooling fan may be utilized as much as possible, increasing the device's potential for a long life.

Sampling an audio file to determine the loudness data to control the state of a fan may occur prior to or during its execution by an electronic device. In this way, loudness data may be extracted from an audio file, for example while the electronic device is in media playback mode, or while an audio file is received by the device, for example, by broadcast or streaming. Moreover, a digital video recorder (DVR) which is a device that records video in a digital format to a disk drive or other medium, may extract data from an audio file during recording and insert a header. Additionally, a computer media such as a DVD or CD may include loudness data, for example, as a header so that an electronic device may access such information and may control the cooling fan based on the stored loudness data. In this way, loudness data may be beneficially available in different audio file media formats.

The instant disclosure is provided to explain in an enabling fashion the best modes of making and using various embodiments in accordance with the present invention. The disclosure is further offered to enhance an understanding and appreciation for the invention principles and advantages thereof, rather than to limit in any manner the invention. While the preferred embodiments of the invention are illustrated and described here, it is clear that the invention is not so limited. Numerous modifications, changes, variations, substitutions, and equivalents will occur to those skilled in the art having the benefit of this disclosure without departing from the spirit and scope of the present invention as defined by the following claims.

It is understood that the use of relational terms, if any, such as first and second, up and down, and the like are used solely to distinguish one from another entity or action without necessarily requiring or implying any actual such relationship or order between such entities or actions.

Much of the inventive functionality and many of the inventive principles are best implemented with or in software programs or instructions and integrated circuits (ICs) such as application specific ICs. In the interest of brevity and minimization of any risk of obscuring the principles and concepts according to the present invention, discussion of such software and ICs, if any, is limited to the essentials with respect to the principles and concepts within the preferred embodiments.

Figure 1:
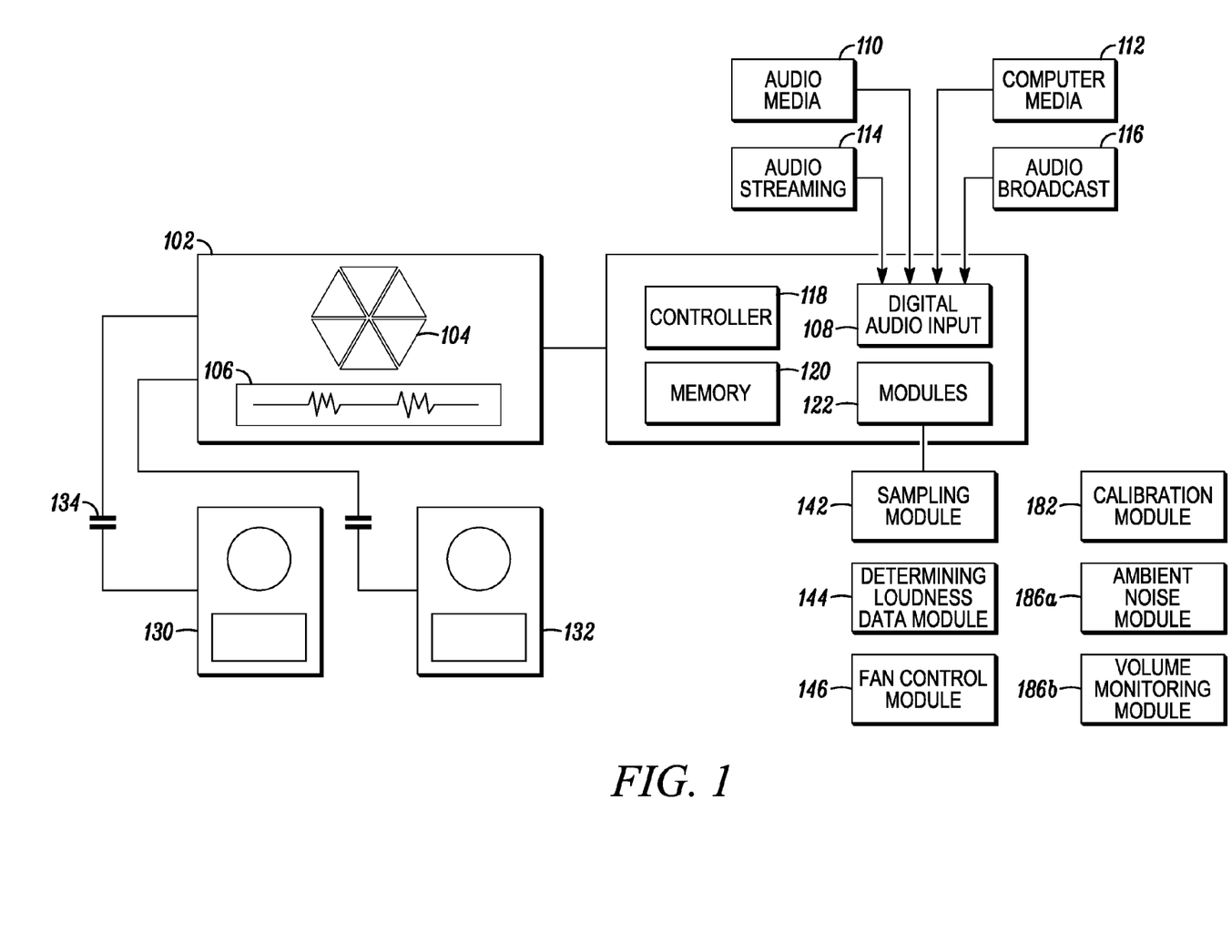
FIG. 1 depicts an electronic device including a fan and configured for audio output that may be previously or in real-time sampled to determine loudness data.

FIG. 1 depicts an electronic device 102 including a fan 104, the device 102 being configured for audio output 106 that may be previously or in real-time or in near-to-real-time sampled to determine loudness data. The electronic device 102 is any type of device that produces audio output 106 or operates in conjunction with a device the produces audio output. For example, a radio, media playback device such as a CD player, a television, a DVD or DVR player and a computer may produce audio output 106. Additionally, the electronic device 102, for example may be a rear projector television including a fan 104 which itself may not produce audio output, however, may operate in conjunction with an audio output device. Moreover, an electronic device 102 may be for example a cable box for receiving transmissions, the box including a fan 104. Also, an electronic device 102 may be for example an amplifier for any type of musical instrument or public address system which includes a fan 104. While a fan 104 is utilized as the most common cooling device, other cooling systems that may generate noise are within the scope of this discussion. Moreover, the described methods and devices further include devices with more than one fan, and/or an external fan. It is understood that any device that utilizes a cooling fan 104 or another cooling device and is used in conjunction with audio output is within the scope of this discussion.

The audio input 108 that is previously or in real-time sampled may be delivered in any form. The audio input 108 may be in the form of an audio data file such as audio media 110 which may be for example a CD or a DVD that may be read by the device and/or computer media 112 that includes both content and predetermined loudness data that may be read by the device 102. The audio output 108 may alternatively or also be in the form of an audio data file received via audio streaming data 114 such as content distributed over the Internet. The audio output may also be in the form of an audio data file received by audio broadcasting 116 such as content distributed over the airwaves, satellite, or cable, that may be received, for example, by a transceiver of the device 102. For example, the device 102 may be a mobile communication device. It is understood that any manner in which the electronic device 102 receives the audio input 108 is within the scope of this discussion. In accordance with different embodiments the disclosed devices and methods, the content of digital audio input 106 may be previously or in real-time or in near-to-real-time sampled for its loudness to determine loudness data. In this way, loudness data beneficially may be available in different audio file media formats.

The electronic device 102 further may include a controller 118, memory 120, and modules 122. The modules can carry out certain processes of the methods as described herein. The modules can be implemented in software, such as in the form of one or more sets of prestored instructions, and/or hardware, which can facilitate the operation of the mobile station or electronic device as discussed below. The modules may be installed at the factory or can be installed after distribution by, for example, a downloading operation. The operations in accordance with the modules will be discussed in more detail below. For example, modules 122 may include a sampling module 142, a determining loudness module 144, a fan control module 146, a calibration module 182, an ambient noise module 186a, and a volume monitoring module 186b.

As mentioned above, the electronic device 102 may provide audio output 106, for example by speakers 130 and 132. The speakers 130 and 132 are illustrated with wires having breaks 134 and 136 which are to illustrate that the volume or power output of the speakers 130 and 132 may be monitored by any suitable method. The speakers 130 and 132 may be any number of speakers and of course may be wireless. The predetermined loudness level of the audio output 106 at a particular volume setting may for example have a value that is sufficiently high to mask fan noise. That is, determined loudness data may be used to control the state of the fan 104.

Figure 2:
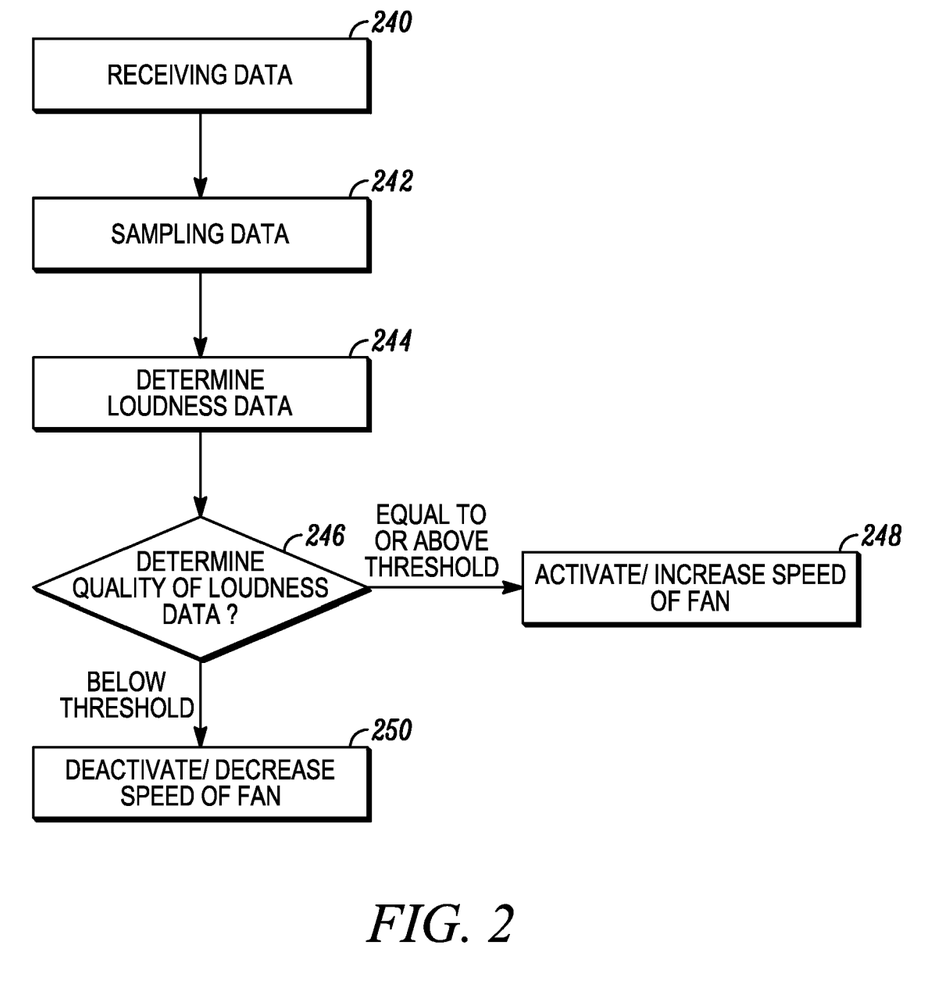
FIG. 2 depicts a flow chart of an embodiment where audio data file is sampled to generate sampled audio data from which loudness data is determined.

FIG. 2 depicts a flow chart of an embodiment where an audio data file is sampled to generate sampled audio data (see FIG. 3) from which loudness data is determined in accordance with, for example, an algorithm which the controller 118 (see FIG. 1) may be configured to execute. Audio data input 108 may be received 240 as described above. The audio data file sampling 242 may be processed in accordance with sampling module 142. Determining loudness data 242 from the sampled audio data may indicate at least one portion of the audio data file having a predetermined loudness level in accordance with determining loudness data module 144. In turn, the quality of the loudness data may be determined 246 to control the state of the fan 104 during audio output 106 based on in whole or in part on the loudness data in accordance with fan control module 146. Controlling the state of the fan 246 may include at least one of activating the fan in accordance with loudness data 248, deactivating the fan in accordance with the loudness data 250 or varying the speed of the fan in accordance with the loudness data 248 and/or 250.

The quality of the loudness data may be a relative value, based on one or more criteria. For example, the power output or volume of the speakers 130 and 132 may determine a threshold value for controlling the state of the fan 246. Other factors that will be discussed below may also be taken into account when utilizing the quality of the loudness data for controlling the state of the fan 246 of the electronic device 102 (see FIG. 1).

Figure 3:
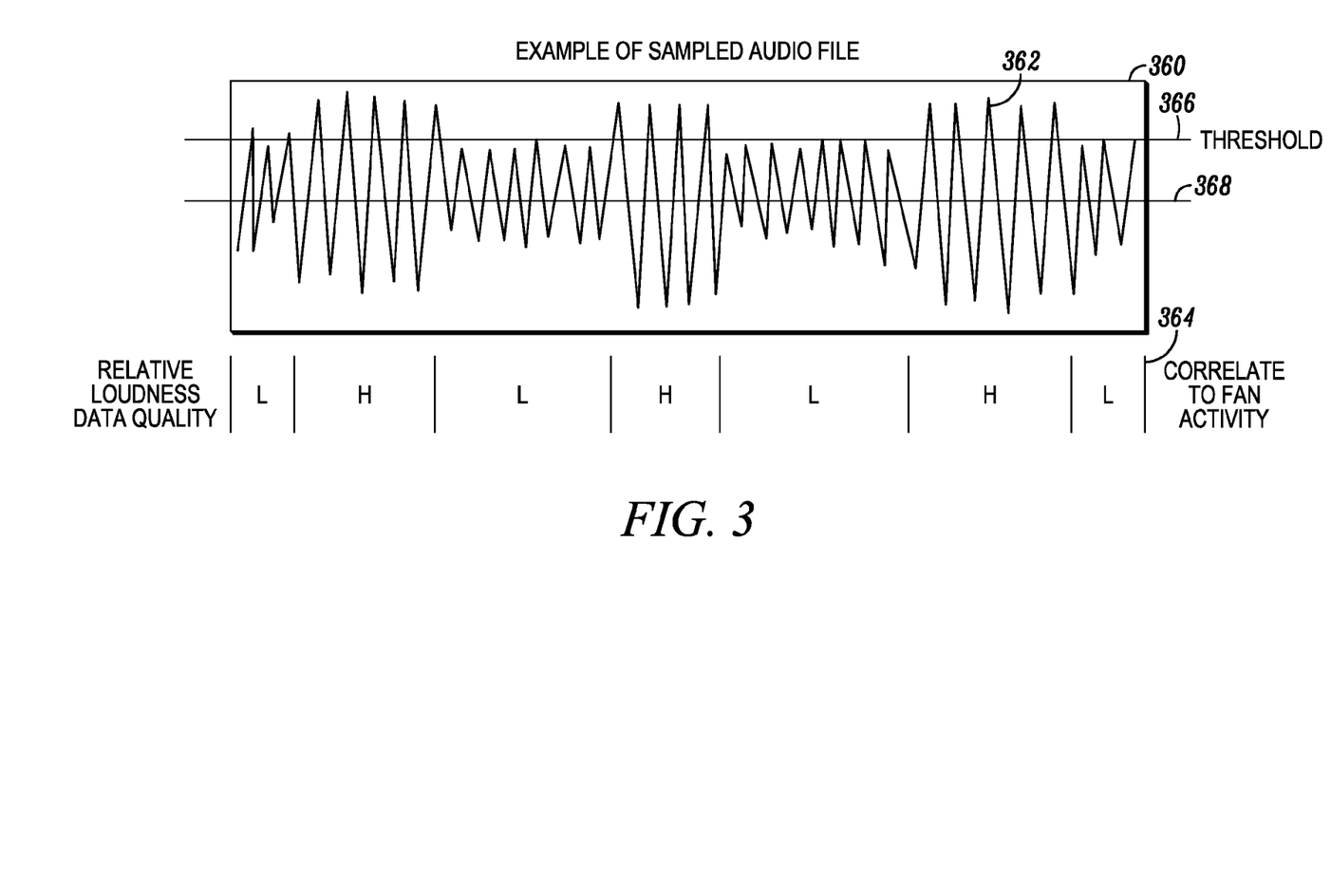
FIG. 3 is a graph of an example of a sampled audio file illustrating loudness amplitudes from which loudness data may be determined that may be used to correlate with fan activity.

FIG. 3 is a graph 360 of an example of a sampled audio file 362 illustrating loudness amplitudes from which loudness data 364 may be determined that may be used to correlate with fan 104 (see FIG. 1) activity. As mentioned above, the audio input 108 that is previously or in real-time sampled may be delivered in any form. For example, an audio data file as audio input 108 from which to derive sampled data 362 in real-time may be an audio data file such as audio media 110 which may be for example a CD or a DVD, audio streaming 114 such as content distributed over the Internet, and audio broadcasting 116 such as content distributed over the airwaves, satellite, or cable. Alternatively, the loudness data may be delivered with the content, or separately from the content, for example, in the form of a header. Such loudness data may be imbedded on CD, DVD, or may be pre-processed and delivered with a cable and broadcast transmission. In any case, a map of the loudness data 362 may be created previously or in real-time and stored in the memory 120.

The sampled audio file 362 illustrates in certain portions loudness amplitudes that exceed a threshold value 366 which can be any suitable distance from the median 368. The threshold 366 may be fixed or may be variable, taking into consideration different factors such as a predetermined or variable duty cycle. Below the graph 360, indicated by "L" for a low loudness value and "H" for a high loudness value is a mapping of the relative loudness data 364 that may be correlated to fan activity.

Sampling an audio file 362 to determine loudness values 364, is a predictive process that may analyze the datastream of recorded audio or audio-visual data to predict when it may be the best time to run one or more fans 104 (see FIG. 1). In one embodiment, a progressive scan may progressively scan audio that is playing. An algorithm to change the cooling fan speed and therefore noise may correspond with the predicted higher/lower level of the audio output 106 over time. During a real-time or near-to-real-time scan, the system of the electronic device 102 can monitor audio data file flow during download or while receiving a broad cast with a small delay such as 30 seconds between receiving the audio data file and generating the sampled audio file 362. The system may then to anticipate high portions of the loudness data and low portions of the loudness data 364. In another embodiment, a scan may analyze a buffered audio file. In any case, the system may anticipate from loudness data 364 from one or multiple streams how to control the fan 104.

In one embodiment, audio media 110 which may be a CD or DVD may include an audio data file that may be sampled in real-time or in near-to-real-time to generate sampled audio data in accordance with an algorithm which the controller 118 may be configured to execute. For example, prior to generating audio output 106, an audio data file of audio media 110 may be buffered in memory 120. By buffering the audio data file in the memory 120, and then sampling or scanning the buffered audio data file to determine loudness data, a map of the loudness data (see FIG. 3) may be created and stored in the memory 120. A loudness data map may be retained in memory 120 for future reference and therefore referenced when the audio is played. It is understood that any number of loudness data maps may be stored in memory 120 or any other suitable manner.

For broadcast or streamed data there may be a small delay to optimize the fan 104 control. For example, the system of the electronic device 102 may anticipate where in an action video there is sustained loud action noise. The system of the electronic device 102 may integrate across the action noise to determine when it may buy time to deactivate or slow down the fan 104 during next quiet time. For example, the fan 104 (see FIG. 1) may be accelerated for 30 seconds to get air momentum in the electronic device 102 for quiet part of the sampled audio file 362. In another example, live football live, a broadcaster may provide a 30 second delay. The system may buffer and process data with an additional 30 seconds delay and integrate across sustained crowd noise to determine when it may buy time to deactivate or slow down the fan 104 during the next quiet time. The processing power of the controller 118 (see FIG. 1) may require as little as 5 seconds to analyze high portions and low portions 364 of the sampled audio file 362 to determine the loudness data 364 since audio data may not be complex.

Various characteristics of the audio output may be considered. The duration of higher-amplitude sound, the amount of amplification, and the characteristics of the content (i.e., deep base verses mid-tones verses high-treble) may be analyzed to optimize the masking of the fan noise. For instance, a section of a movie with a loud battle scene would be anticipated and assuming the pitch of the high-amplitude noise is matched to the audio curve of the fans, the fans could be run hard during this scene to evacuate large amounts of heated air. By predicting the loudness value with respect to characteristics of fan noise and characteristics of the audio output 106 (see FIG. 1), the system would have time to activate and de-activate a fan to avoid overrun (i.e., in the case where the fans do not stop as abruptly as the audio). Loud and highly-amplified sound generally requires more power, and thus will result in elevated temperatures within the system. Synergistically, the operating scenario of the disclosed devices and methods may run the fans at the highest speed with little or no impact on the user experience.

Figure 4:
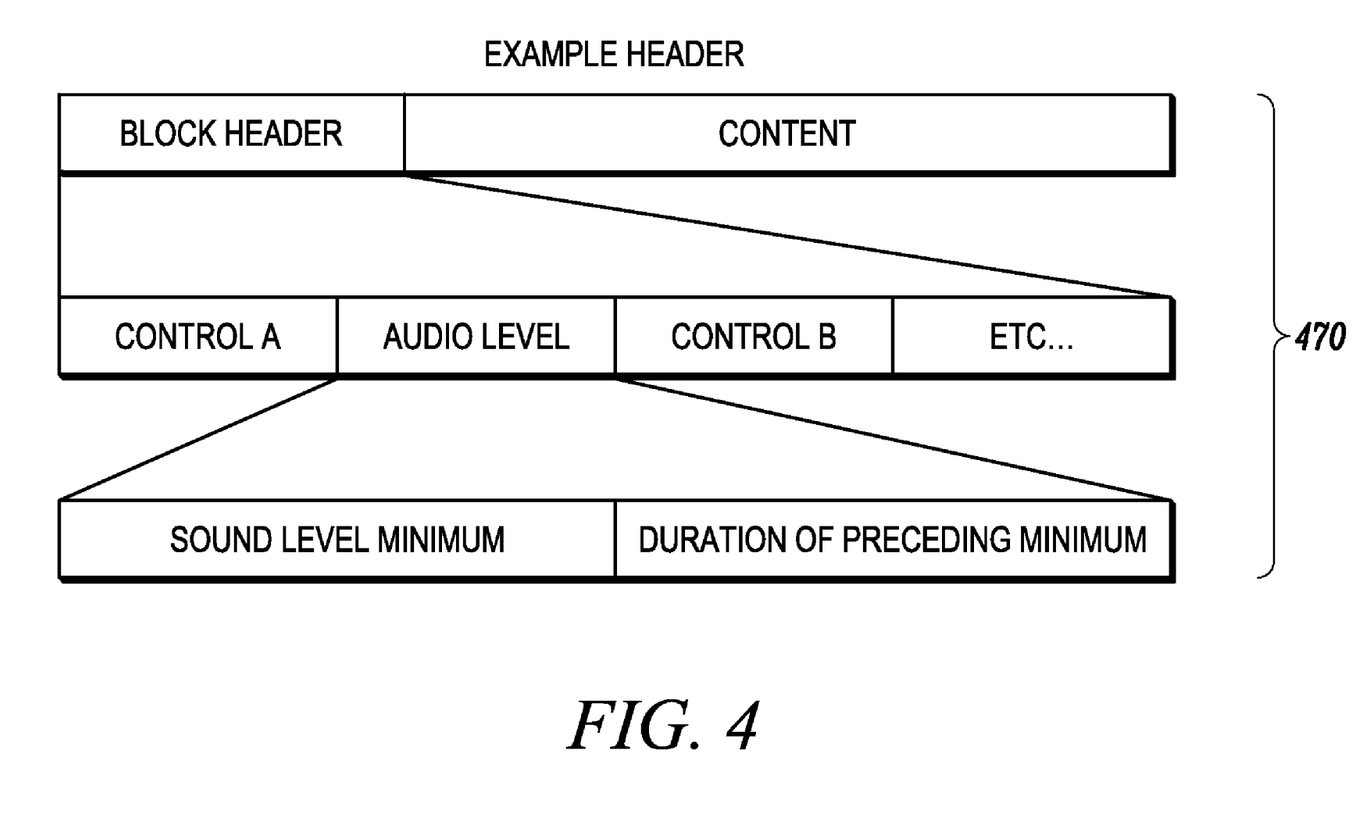
FIG. 4 illustrates an example pre-processed header including a loudness data map that may be delivered to an electronic device.

FIG. 4 illustrates an example pre-processed header including a loudness data map 470 that may be delivered to an electronic device 102. As mentioned above, computer media 112 (see FIG. 1) may include content in the form of an audio data file configured for audio output and loudness data 364 (see FIG. 3) identifying at least one portion of the audio data file of a predetermined loudness level. Additionally, audio streaming 114 and/or audio broadcast 116 may include predetermined loudness data 364. The header 420 or any other type of instructions or mapping may also include instructions to control the state of a fan 104 based on the loudness data 364 during generation of the audio output by an electronic device 102. The instructions to control the state of the fan 104 may include instructions for at least one of activating the fan 104 in accordance with the loudness data 364, deactivating the fan 104 in accordance with the loudness data or varying the speed of the fan 104 in accordance with the loudness data 364. In the embodiment illustrated in FIG. 4, the Block Header may proceed the Content and include a Control A followed by Audio Level Data. Following Control A, Control B may be followed by Audio Level Data, and so on. The Audio Level Data May include a Sound Level Minimum and a Duration of Preceding Minimum that, for example, may be calibrated against a known fan noise level.

Figure 5:
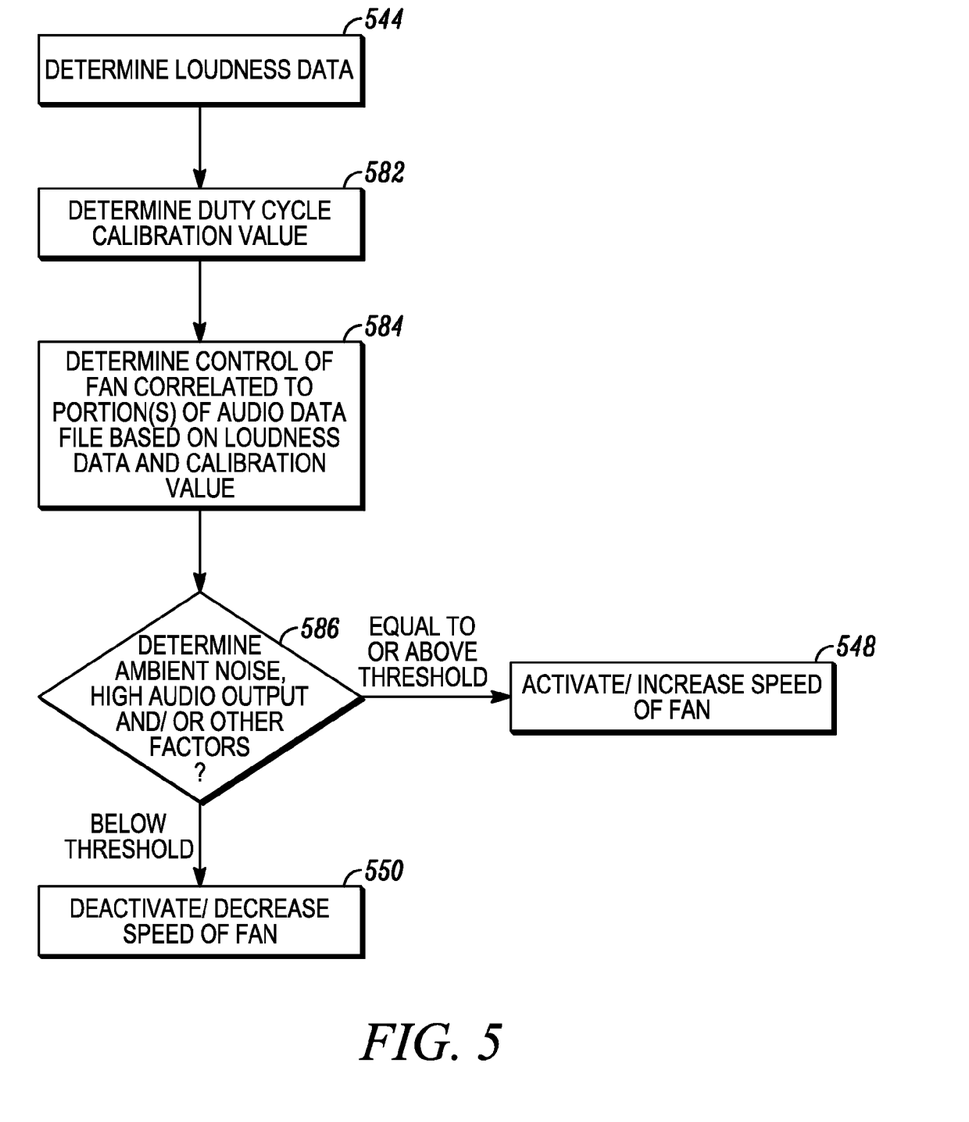
FIG. 5 is a flowchart of an embodiment of the disclosed methods including additional factors to determine control of a fan of an electronic device.

FIG. 5 is a flowchart of an embodiment of the disclosed methods including additional factors to determine control of a fan 104 (see FIG. 1) of an electronic device 102. Upon determining loudness data 544, the system may in conjunction with other factors, for example, using a control algorithm to direct the fan 104 of an electronic device 102 to run when the audio output 106 noise levels are high enough to mask the sound of the fan 104, and to deactivate or slow down the fan 104 when noise levels are low. For example, additional factors may include a determined calibration value 582 based upon a duty cycle that is correlated to one or more portions of the loudness data 364 (see FIG. 3) of an audio file to determine control of the fan 584. Determining a calibration value 582 based upon a duty cycle may be performed in accordance with the calibration value module 182. Duty cycle may be preset by manufacturer or determined by other factors. For example, the duty cycle may be 50% of the time that the device is in an "on" state. The fan 104 activity may then be spread out throughout the duty cycle.

Regulation of the fan speed may provide different benefits while the fan is at different speeds. Other factors may be used in conjunction with controlling 586 the state of the fan 104 by determining the loudness data 544. The system of the electronic device 102 may factor in other values such as calibration value, monitored ambient noise levels, and monitored volume or power output levels determine the state of the fan 104. As discussed above, the fan speed may be controlled to insure that maximum cooling is accomplished during loud ambient noise but some cooling continues at progressively lower fan speeds as the ambient noise declines. A microphone or array of microphones may detect ambient noise 586 in accordance with ambient noise module 186a. In another embodiment, monitoring the level of power on the speaker lines 134 and 136 or the level to which the amplifiers 106 are set may be accomplished 586 in any suitable manner in accordance with volume monitoring module 586b. In certain surround sound systems, speakers have microphones to run through tests that are different from volume control. In another embodiment, a microphone cable placed where user is sitting that can record sound from fan. Another factor to add to the loudness data to control the fan may include that microphone data may be another factor to adjust the fan 104 activity accordingly. Such a system may be very inexpensive given the state of the art in microphones and the associated signal processor technology for ambient noise filtering.

Utilizing the disclosed methods and in combination with any one or more of the possible additional factors can take advantage of existing infrastructure of many electronic devices to optimize the systems. For example, temperature sensing devices are standard in electronic devices 102 with fans 104. In very quiet scenes the fans would be turned completely off until such time as the temperature rise becomes critical as may be monitored by a temperature sensing device. As described in detail above, particularly in high powered devices, the utilization of loudness data to control the state of the fan may be a safety net in addition to temperature sensing devices for the extreme user without ruining the experience of extreme user. That is, operating the fan 104 appropriately may help to keep a device reliable.

It is understood that combinations of the above embodiments could be used, such as a microphone coupled with speaker-line power sensing to provide calibration based on ambient noise and/or power output of the speakers, and so on. In reference to PC's and laptops, sensing of a streaming audio data file in real-time, or near to real-time may consume little of the device's resources due to the inherent processing power of the devices. In addition, an electronic device 102 (see FIG. 1) could detect when a headset is inserted or when a wireless headset is utilized, in which case the fans could run unrestrained. In PC's, as in other electronic devices 102, average internal temperature is inversely related to product life, so the cooler the unit is maintained over it's lifetime the longer it will last. Therefore, even in cases where the fan may not need to run to prevent imminent overheating, if the ambient noise is sufficiently loud or the unit is being played at high audio levels it may be prudent to use those intervals of high loudness to lower the internal temperature. On the other hand, while a loud section or portion is predicted but the electronic device 102 is not running hot, a determination can be made that the device 102 need not activate or run the fan 104 which may be beneficial to save on wear and tear of fan 104 and save on power.

Disclosed are methods and devices for controlling the state of a fan of an electronic device during audio output based in whole or in part on loudness data of a digital audio file. An audio data file is sampled so that loudness data is determined from the sample audio data. The loudness data may indicate at least one portion of the audio data file that has a predetermined loudness level. For example, when the loudness data indicates that the audio output is low, the fan can be deactivated or slowed. In this way the noise of the fan does not impair the user's audio experience. Alternatively, when the loudness data indicates that the audio output is high, the fan can be activated or its speed may be increased. The predetermined loudness level of the audio output may have a value that is sufficiently high to mask fan noise. Also, in particular, high powered systems, it may be beneficial to operate the fan as much as possible, based on at least the above-described loudness data and optionally other factors. In this manner, a cooling fan may be utilized as much as possible, increasing the device's potential for a long life.

Sampling an audio file to determine the loudness data to control the state of a fan may occur prior to or during its execution by an electronic device. In this way, loudness data may be extracted from an audio file, for example while the electronic device is in media playback mode, or while an audio file is received by the device, for example, by broadcast or streaming. Additionally, computer media such as a DVD or CD may include loudness data, for example, as a header so that an electronic device may access such information and may control the cooling fan based on the stored loudness data. Moreover, a broadcast or streaming data may include loudness data that may be utilized by the electronic device. In this way, loudness data utilized to control the state of the fan may be beneficially available in different audio file media formats.

This disclosure is intended to explain how to fashion and use various embodiments in accordance with the technology rather than to limit the true, intended, and fair scope and spirit thereof. The foregoing description is not intended to be exhaustive or to be limited to the precise forms disclosed. Modifications or variations are possible in light of the above teachings. The embodiment(s) was chosen and described to provide the best illustration of the principle of the described technology and its practical application, and to enable one of ordinary skill in the art to utilize the technology in various embodiments and with various modifications as are suited to the particular use contemplated. All such modifications and variations are within the scope of the invention as determined by the appended claims, as may be amended during the pendency of this application for patent, and all equivalents thereof, when interpreted in accordance with the breadth to which they are fairly, legally and equitably entitled.

The invention claimed is:

1. A method for controlling a fan of an electronic device, comprising:
   receiving an audio data file configured for audio output;
   accessing loudness data from a header of the audio data file;
   determining from the loudness data at least one portion of the audio data file having a predetermined loudness level; and
   controlling the state of the fan during audio output based on the loudness data.

2. The method of claim 1, wherein controlling the state of the fan further comprises at least one of activating the fan in accordance with loudness data, deactivating the fan in accordance with the loudness data or varying the speed of the fan in accordance with the loudness data.

3. The method of claim 2 wherein controlling the state of the fan further comprises accessing a calibration value so that during audio output the fan is activated for a predetermined period of time based on the loudness data and the calibration value.

4. The method of claim 1, further comprising:
   determining the ambient noise during the audio output to generate ambient noise data; and wherein:
   controlling the state of the fan is based on loudness data and the ambient noise data.

5. The method of claim 1, further comprising:
   monitoring the loudness of the audio output; and wherein:
   controlling the state of the fan is based on the loudness data and the measured loudness of the audio output.

6. The method of claim 1, wherein the method further comprises:
   the electronic device generating audio output.

7. The method of claim 1, wherein receiving comprises:
   reading the audio data file from a computer media.

8. The method of claim 1, wherein receiving comprises:
   transceiving the audio data file.

9. A computer media, comprising:
   an audio data file configured for audio output;
   loudness data of a header of the audio data file identifying at least one portion of the audio data file of a predetermined loudness level; and instructions to control the state of a fan based on the loudness data during the audio output.

10. The computer media of claim 9, wherein the instructions to control the state of the fan include instructions for at least one of activating the fan in accordance with the loudness data, deactivating the fan in accordance with the loudness data or varying the speed of the fan in accordance with the loudness data.

* * * * *